(12) United States Patent
Boyd et al.

(10) Patent No.: US 11,701,741 B2
(45) Date of Patent: Jul. 18, 2023

(54) METHODS AND APPARATUS FOR MANUFACTURE OF MOMENT CONNECTION COMPONENTS

(71) Applicant: ConXtech, Inc., Pleasanton, CA (US)

(72) Inventors: John S. Boyd, Tiburon, CA (US); Kevin Marek, Hayward, CA (US); Eric Bellman, Hayward, CA (US); Maxwell C. Simmons, Hayward, CA (US); Robert J. Simmons, Hayward, CA (US); Brian Hood, San Francisco, CA (US)

(73) Assignee: ConXtech, Inc., Pleasanton, CA (US)

( * ) Notice: Subject to any disclaimer, the term of this patent is extended or adjusted under 35 U.S.C. 154(b) by 1163 days.

(21) Appl. No.: 16/270,573

(22) Filed: Feb. 7, 2019

(65) Prior Publication Data

US 2019/0247963 A1 Aug. 15, 2019

Related U.S. Application Data

(60) Provisional application No. 62/628,814, filed on Feb. 9, 2018, provisional application No. 62/628,807, filed on Feb. 9, 2018.

(51) Int. Cl.
*B23K 37/00* (2006.01)
*B23K 37/04* (2006.01)
(Continued)

(52) U.S. Cl.
CPC ...... *B23K 37/0435* (2013.01); *B23K 37/0452* (2013.01); *E04B 1/2403* (2013.01);
(Continued)

(58) Field of Classification Search
CPC ............ B23K 37/0435; B23K 37/0452; B23K 2101/24; B23K 2101/28; B23K 2103/04;
(Continued)

(56) References Cited

U.S. PATENT DOCUMENTS 2,768,597 A 10/1956 Smith
3,069,153 A 12/1962 Brown
(Continued)

FOREIGN PATENT DOCUMENTS

CN 102672403 A 9/2012
CN 202591902 U 12/2012
(Continued)

OTHER PUBLICATIONS

China National Intellectual Property Administration, First Office Action regarding Chinese Patent Application No. 2019800227317, dated Feb. 16, 2022, 11 pages.
(Continued)

*Primary Examiner* — Kiley S Stoner
(74) *Attorney, Agent, or Firm* — Kolisch Hartwell, P.C.

(57) ABSTRACT

A collar flange assembly welding fixture is disclosed, including a stand, a circular mount structure, and a support assembly which are configured to provide access to a front side and a back side of a collar flange assembly held by the support assembly. The stand has a plurality of circumferential bearings equidistant from an axis of rotation, the circular mount structure is rotatably supported by the circumferential bearings, and the support assembly is configured for mounting on the circular mount structure.

17 Claims, 9 Drawing Sheets

(51) Int. Cl.
*E04B 1/24* (2006.01)
*E04G 21/16* (2006.01)
*B23K 103/04* (2006.01)
*B23K 101/28* (2006.01)
*B23K 101/24* (2006.01)

(52) U.S. Cl.
CPC ........ *E04G 21/163* (2013.01); *B23K 2101/24* (2018.08); *B23K 2101/28* (2018.08); *B23K 2103/04* (2018.08); *E04B 2001/2415* (2013.01); *E04B 2001/2424* (2013.01); *E04B 2001/2457* (2013.01)

(58) Field of Classification Search
CPC .......... B23K 37/0538; B23K 37/04–08; E04B 1/2403; E04B 2001/2415; E04B 2001/2424; E04B 2001/2457; E04G 21/163
USPC .... 228/212–213, 44.3–44.5, 47.1, 49.1–49.4
See application file for complete search history.

(56) References Cited

U.S. PATENT DOCUMENTS

| | | | |
|---|---|---|---|
| 3,744,138 A | 7/1973 | Schuler | |
| 4,327,786 A | 5/1982 | Markkula | |
| 6,405,422 B1 | 6/2002 | Hoenigman | |
| 7,621,099 B2 | 11/2009 | Simmons | |
| 7,837,084 B2* | 11/2010 | Simmons | B23K 37/0443 228/49.1 |
| 7,941,985 B2 | 5/2011 | Simmons | |
| 8,056,796 B2* | 11/2011 | Simmons | B23K 37/0443 228/49.1 |
| 2004/0089699 A1 | 5/2004 | Simmons | |
| 2008/0296353 A1 | 12/2008 | Simmons | |
| 2016/0016267 A1 | 1/2016 | Beatty et al. | |
| 2016/0332265 A1 | 11/2016 | Tsui et al. | |
| 2019/0143462 A1* | 5/2019 | Simmons | B23K 37/0533 269/153 |
| 2019/0202011 A1* | 7/2019 | Watkins | B23K 37/047 |
| 2019/0247962 A1* | 8/2019 | Boyd | B23K 37/04 |
| 2022/0228359 A1* | 7/2022 | Boyd | E04B 1/1912 |

FOREIGN PATENT DOCUMENTS

| | | |
|---|---|---|
| CN | 103706985 A | 4/2014 |
| CN | 204135617 U | 2/2015 |
| CN | 204339205 U | 5/2015 |
| CN | 106312392 A | 1/2017 |
| GB | 2510158 A | 7/2014 |
| JP | S58-74300 A | 5/1983 |
| JP | 2010253592 A | 11/2010 |

OTHER PUBLICATIONS

UK Intellectual Property Office, Examination Report under Section 18(3) regarding UK Patent Application No. GB2014138.8, dated Mar. 4, 2022, 4 pages.
U.S. Receiving Office of WIPO, International Search Report regarding PCT Patent Application No. PCT/US2019/017140, dated Jun. 5, 2019, 12 pages.
U.S. Receiving Office of WIPO, Written Opinion of the International Searching Authority regarding PCT Patent Application No. PCT/US2019/017140, dated Jun. 5, 2019, 5 pages.
The International Bureau of WIPO, International Preliminary Report on Patentability regarding PCT Patent Application No. PCT/US2019/017140, dated Aug. 20, 2020, 7 pages.
UK Intellectual Property Office, Examination Report under Section 18(3) regarding UK Patent Application No. GB2014138.8, dated Dec. 2, 2022, 5 pages.
China National Intellectual Property Administration, Second Office Action regarding Chinese Patent Application No. 2019800227317, dated Jan. 3, 2023, 15 pages.
Japan Patent Office, Notice of Reason for Rejection regarding Japanese Patent Application No. 2020-542869, dated Jan. 24, 2023, 11 pages.
European Patent Office, Extended European Search Report regarding European Patent Application No. 19751885.5, dated Dec. 7, 2021, 6 pages.

* cited by examiner

METHODS AND APPARATUS FOR MANUFACTURE OF MOMENT CONNECTION COMPONENTS

CROSS-REFERENCES

This application claims the benefit under 35 U.S.C. § 119(e) of the priority of U.S. Provisional Patent Application Ser. No. 62/628,814, filed Feb. 9, 2018, and of U.S. Provisional Patent Application Ser. No. 62/628,807, filed Feb. 9, 2018, the entireties of which are hereby incorporated by reference for all purposes. U.S. Pat. No. 7,941,985 B2 is also incorporated by reference herein, in its entirety, for all purposes.

INTRODUCTION

Full moment collar beam mounts offer a valuable improvement over on-site welding techniques for steel frame building construction. Welding can be done off site in controlled conditions, and connected beam mounts seat frame members in proper spatial orientation at a construction site.

U.S. Pat. No. 7,941,985 discloses an exemplary full moment collar beam mount, described as a halo/spider connection. A collar corner assembly is welded to each of the four corners of the column. At each face of the column, a flange sub-assembly of an upper flange and a lower flange connected by a web insert is received in a tapered channel formed between the collar corner assemblies at the adjacent corners. Where a beam and a column connect, the flange sub-assembly is welded to the end of the beam. Connections across all faces of the column together form a full moment collar.

The beam connections allow precise building frame construction, but also require precise manufacturing. Along the length of a building frame, many beam and column connections line up and tolerances or imprecisions from the connections may be added or multiplied. This can result in undesirable overall deviation from specifications. Manufacturing tools and methods are needed to facilitate precise positioning and welding of beam connection components in the manufacturing process.

An important part of a collar manufacturing process is the welding of upper and lower flanges and web inserts into flange sub-assemblies. The components must be securely supported in a precise spatial configuration relative to one another during welding, and welding access made safely and easily available to workers.

SUMMARY

The present disclosure provides systems, apparatuses, and methods relating to collar flange assembly welding fixtures. In some examples, a collar flange assembly welding fixture may include a stand, a circular mount structure, and a support assembly which are configured to provide access to a front side and a back side of a collar flange assembly held by the support assembly. The stand may have a plurality of circumferential bearings equidistant from an axis of rotation, the circular mount structure may be rotatably supported by the circumferential bearings, and the support assembly may be configured for mounting on the circular mount structure.

In some examples, a collar flange assembly welding fixture may include a plate structure and a pair of collar corner simulators attached to the plate structure. The collar corner simulators may be configured to support top and bottom collar flange members on opposite ends of a bridging element. The plate structure may include a central opening that provides welding access from both a front side and a back side of the welding fixture.

In some examples, a method of welding a collar flange assembly may include positioning first and second collar corner simulators on a rotatable plate structure. The method may further include receiving top and bottom flange members between the first and second collar corner simulators, and positioning a bridge element between the top and bottom flange members. The method may further include welding the flange members to the bridge element through an opening provided in the plate structure.

Features, functions, and advantages may be achieved independently in various examples of the present disclosure, or may be combined in yet other examples, further details of which can be seen with reference to the following description and drawings.

DETAILED DESCRIPTION

Figure 1:
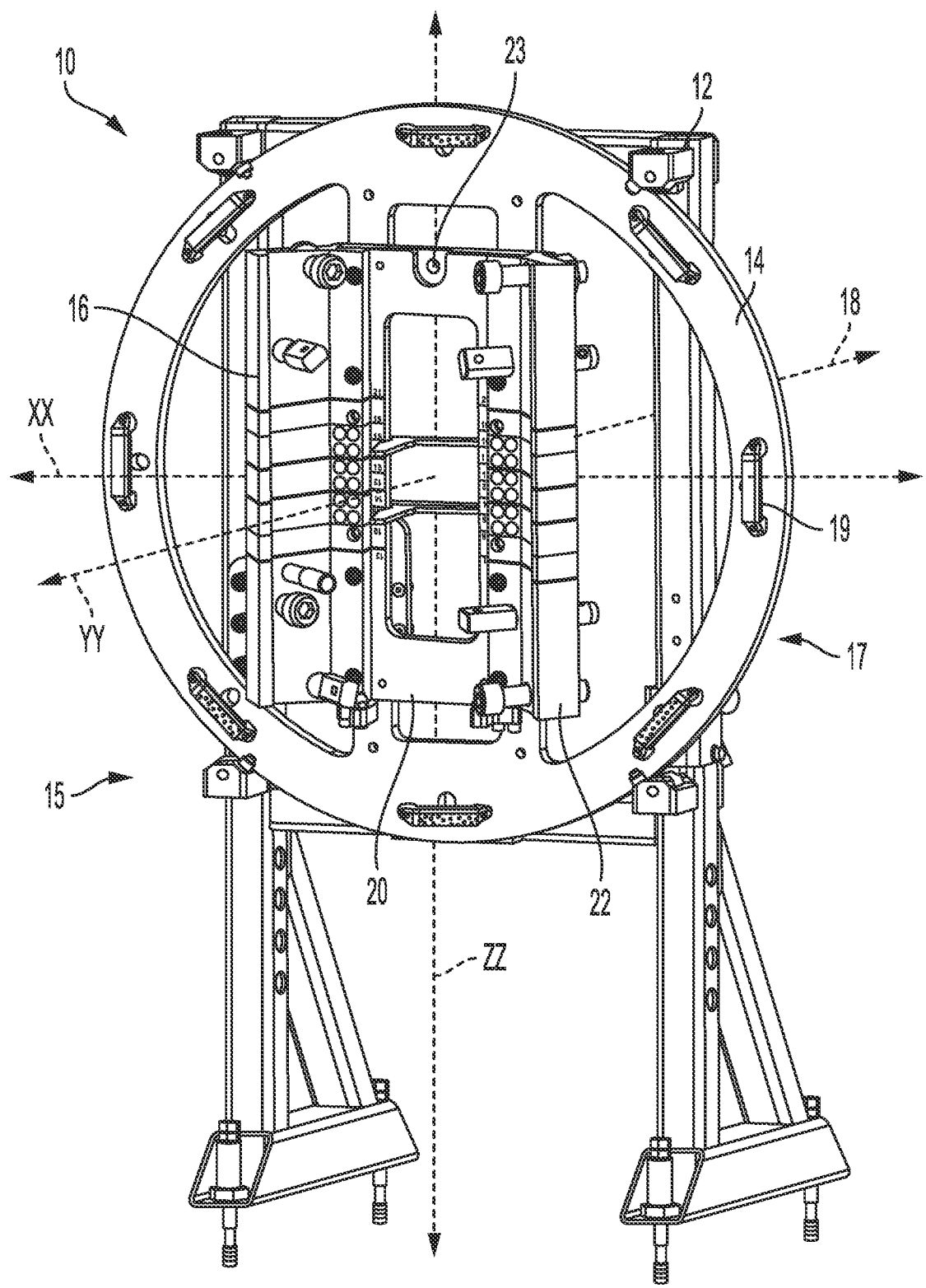
FIG. 1 is an isometric view of an illustrative collar flange assembly welding fixture, according to aspects of the present disclosure.

Various aspects and examples of a collar flange assembly welding fixture, as well as related methods, are described below and illustrated in the associated drawings. Unless otherwise specified, a collar flange assembly welding fixture in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A and B, each of which is labeled accordingly.

Overview

In general, a collar flange assembly welding fixture in accordance with the present teachings may include a support assembly configured to hold components of a collar flange assembly in a precise spatial relationship. While the components of the collar flange assembly are held, welding or other operations may be performed to temporarily or permanently fix the components together in that spatial relationship.

The support assembly may include a simulator recreating the geometry of a column with attached collar corner assemblies of a full-moment collar. Supporting the collar flange assembly components with the simulator may hold the components in the desired spatial relationship. The support assembly may be permanently or removably coupled to a mount structure, such as a mount ring. The mount structure may be rotatably supported by a stand, which may include circumferential bearings, an axle, or any appropriate rotational structure.

Rotating the simulator using the rotatable mount structure may allow access to different surfaces or portions of the collar flange assembly for welding or other processes. Fasteners or other means may be used to retain the components of the collar flange assembly in the simulator during rotation. The stand, the rotatable mount structure, and/or the simulator may have apertures to allow front and back access to the collar flange assembly.

EXAMPLES, COMPONENTS, AND ALTERNATIVES

The following sections describe selected aspects of exemplary collar flange assembly welding fixture as well as related systems and/or methods. The examples in these sections are intended for illustration and should not be interpreted as limiting the entire scope of the present disclosure. Each section may include one or more distinct examples, and/or contextual or related information, function, and/or structure.

A. Illustrative Welding Fixture

As shown in FIGS. 1-9, this section describes an illustrative assembly station 10. Assembly station 10 is an example of a collar flange assembly welding fixture, described above. As shown in FIG. 1, the assembly station includes a stand 12, a ring structure 14, and a support assembly 16. Ring 14 is rotatably supported on multiple bearings 60 of stand 12. Support assembly 16 is mounted to ring 14, such that the assembly rotates with the ring relative to stand 12. The support assembly is mounted at on a front side 15 of assembly station 10, and is accessible from both the front side and a back side 17 of the assembly station.

Assembly station 10 can be described in terms of an X-axis, a Y-axis, and a Z-axis, generally indicated at XX, YY, and ZZ, respectively. The Z-axis is a vertical axis bisecting ring 14 and lying in a plane defined by the ring. The X-axis is a horizontal axis bisecting ring 14 and also lying the plane defined by the ring. The Y-axis is a horizontal axis central to ring 14 and perpendicular to the plane defined by the ring.

Ring 14 has an axis of rotation 18, about which the ring and support assembly 16 both rotate. Axis of rotation 18 coincides with the Y-axis, and ring 14 rotates in the X-Z plane. Ring 14 includes a circular annular portion and four projections extending from the annular portion toward the center of the ring. Support assembly 16 is mounted to the four projections, proximate the center of the ring. The assembly may be fastened or otherwise removably connected to the ring.

Multiple handles 19 are mounted on ring 14 to allow a user to manually rotate the ring. In the pictured example, handles 19 are mounted to a forward face of ring 14. In other examples, one or more handles may be mounted on an outer edge of the ring or at any point on the ring that does not impede use of assembly station 10. In some examples, support assembly 16 may be rotated by other means such as electrical controls housed in stand 12. A user of assembly station 10 may rotate support assembly 16 between steps of a welding process, in order to access selected portions of supported components and/or place welding surfaces in a desirable orientation.

Support assembly 16 is configured to support a collar flange assembly of a full-moment collar. In general terms, the support assembly simulates one face of a column prepared for connection to a beam. Assembly station 10 may include one or more additional support assemblies configured to simulate different collars, and/or configured to support other collar components. An appropriate one of the support assemblies may be fastened to ring 14 prior to welding of a collar component. As shown in more detail in FIG. 2, support assembly 16 includes a faceplate 20, onto which two collar corner simulators 22 are bolted. Together, the two collar corners positioned on faceplate 20 form a channel configured to receive components of a collar flange assembly.

Figure 3:
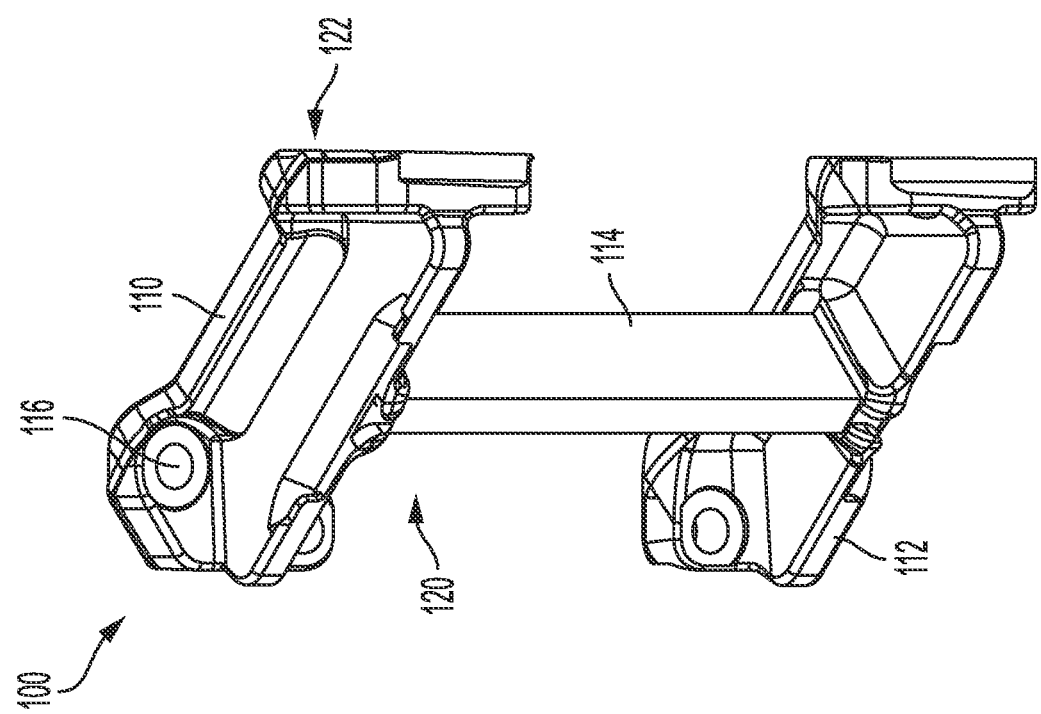
FIG. 3 is an isometric view of an illustrative collar flange assembly

FIG. 3 shows an illustrative collar flange assembly 100, which may be welded together using support assembly 16. In a full-moment collar, flange assembly 100 may be welded to the end of a beam and may be received between a pair of collar corner assemblies. The collar flange assembly includes a top flange member 110 and a bottom flange member 112 connected by a bridging element or web insert 114. Each flange member includes a plurality of bolt holes 116, for fastening together a completed collar. Assembly 100 may be described as having a beam-facing or front side 120 and a column-facing or back side 122.

Each of flanges 110, 112 and insert 114 may be separately manufactured by molding and/or machining. The flanges may have a standard size, while web insert 114 may be selected according to a depth of the beam to which the assembly will be connected. The separate components may be secured in a precise spatial relationship by the support assembly, while being welded together. Such precise positioning during welding may help to ensure precise configuration and dimensions of a completed collar flange assembly.

Figure 4:
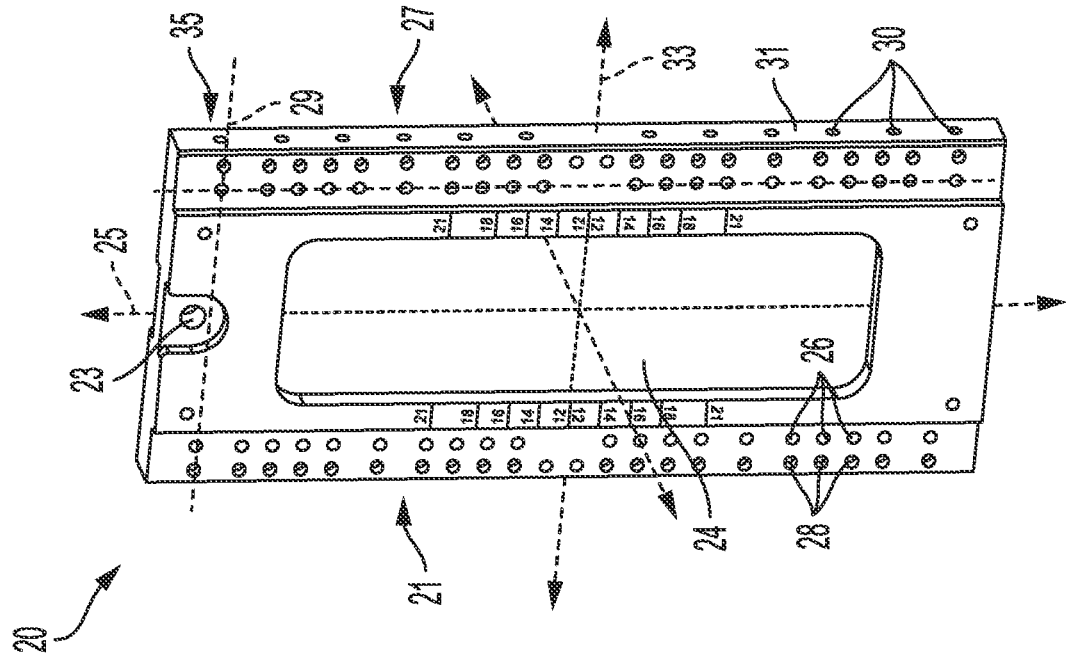
FIG. 4 is an isometric view of the faceplate of the welding fixture of FIG. 1.

As shown in FIG. 4, faceplate 20 of the support assembly is generally rectangular in shape, with a central aperture 24. The faceplate has a front face 21, a back face 27, and opposing side edges 31. The back face may be generally planar, while the front face is recessed along two opposing sides to partially mate with and guide correct placement of the collar corner simulators. The faceplate has a center line 33 and a longitudinal axis 25.

When support assembly 16 is mounted to ring 14, as shown in FIG. 1, faceplate 20 is oriented such that front face 21 is perpendicular to axis of rotation 18 and parallel to the plane of the ring. In other words, longitudinal axis 25 and center line 33 are each perpendicular to axis of rotation 18. The faceplate may be described as having a central axis aligned with axis of rotation 18. Faceplate 20 rotates in a plane parallel to the front and back faces of the plate.

The orientation of faceplate 20 may also be described in terms of the X-axis, Y-axis, and Z-axis of assembly station 10. When mounted to ring 14, longitudinal axis 25 of faceplate 20 is parallel to the Z-axis, and center line 33 is parallel to the X-axis. The faceplate rotates in a plane parallel to the X-Z plane. Features of support assembly 16 may be described as having an X-axis, Y-axis, or Z-axis location in the context of the upright position of faceplate 20 as shown in FIG. 1.

A lifting point, or connector may also be also included in faceplate 20. In the present example, an aperture 23 is formed at a top end of the plate, suitable for connection to a lifting device such as a crane. Support assembly 16 may be thereby lifted into place for fastening to ring 14 and/or removed from the ring and exchanged for another support assembly.

Referring again to FIG. 4, faceplate 20 includes an array 35 of circular and elongate apertures for securing the collar corner simulators to the faceplate. A first plurality of circular threaded apertures 26 extending into the front face of faceplate 20 are arranged in two parallel lines. The lines of apertures 26 are symmetrically disposed, each line being proximate a side edge 31 of the faceplate. A plurality of laterally elongate slots 28 in front face 21 of faceplate 20 are similarly arranged in two parallel lines, each line proximate a side edge 31 of the faceplate. Each line of circular or elongate apertures is parallel longitudinal axis 25 of faceplate 20. Each elongate slot 28 defines a lateral axis 29, which is perpendicular to longitudinal axis 25 of faceplate 20.

A second plurality of circular threaded apertures 30 extend orthogonal to the first plurality of threaded apertures, into side edges 31 of faceplate 20. Apertures 30 are in arranged in a line parallel to longitudinal axis 25 on each of the side edges. Each plurality of apertures 26, 28, 30 is located to correspond with features of the collar corner simulators, as described further below. In general, any or all apertures may be threaded or shaped to mate with any type of fasteners. Any number of apertures may be included in faceplate 20, arranged in any manner appropriate for connection of collar corner simulators.

Faceplate 20 is configured to allow connection of multiple configurations of the collar corner simulators. That is, each collar corner simulator may connect to a different subset of array of apertures 35 depending on the present configuration. Faceplate 20 includes a plurality of guide markings on front face 21, which indicate correct placement of the collar corner simulators for each configuration. Each configuration may correspond to a collar flange assembly length. The simulators may be symmetrical relative to center line 33 in each configuration, and the guide markings are accordingly mirrored over the center line.

Figure 5:
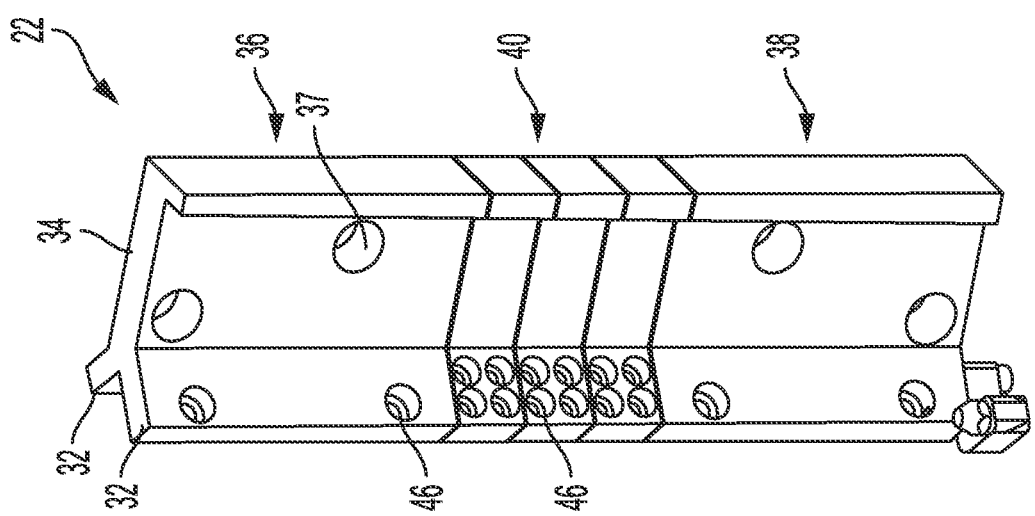
FIG. 5 is an isometric view of a collar corner simulator of the welding fixture of FIG. 1.

FIG. 5 shows a more detailed view of a collar corner simulator 22. Each collar corner has two protrusions or feet 32, extending orthogonal to one another and configured to lay flat against the front face and an adjacent edge of faceplate 20. In other words, the two feet straddle and closely conform to a corner of the faceplate. The two feet may be of the same or differing lengths or thicknesses. An L-shaped main body 34 extends from the intersection of the feet, at an angle parallel to a bisector of the right angle formed between the two feet. That is, an angle of approximately 135 degrees is formed between main body 34 and each of feet 32.

Collar corner simulator 22 includes a top section 36 and a bottom section 38. The collar corner simulator may be configured for different lengths of collar flange assembly, by selection of an appropriate middle section 40. The same top section 36 and bottom section 38 may be used in all configurations, while middle sections with different lengths or multiple middle sections may be used for different configurations. For a minimum length, the middle section may be omitted.

At a bottom end of collar corner simulator 22, a stop structure 58 is mounted. The stop structure simulates the alignment structure formed on collar corner assemblies of a full moment collar. Stop structure 58 is adjustably fastened to forward foot 32 of bottom section 38 of each collar corner simulator 22. The stop structure includes a planar upper surface and sloped or curved side surfaces, configured to contact a complementary bottom surface of a bottom flange member.

Stop structure 58 serves as a gravity catch, supporting the bottom flange of the collar flange assembly, and precisely locating the bottom flange in the vertical direction. The stop structure may also serve to guide the bottom flange into a correct lateral position, precisely locating the bottom flange along the X-axis. In some examples, the stop structures may include optional shims, to create a gap appropriate for galvanization of the collar flange assembly.

The assembly station may include a plurality of middle sections 40, from which an appropriate section or sections can be selected. In some examples, the middle sections may be labeled or classified according to a depth of the intended beam, which in turn corresponds to the length of the collar flange assembly. In some examples, the middle sections may be one or more standard sizes and may be combined to achieve a desired size. Top section 36 and bottom section 38 may be connected to the faceplate according to the guide markings of the faceplate. A middle section or sections may then be selected to correspond to the available space between the top and bottom sections.

Top section 36 and bottom section 38 are each gradually tapered from top to bottom, to receive the tapered shape of a collar flange assembly. Middle section 40 is a consistent width along the section, matching the narrowest end of top section 36 and the widest end of bottom section 38 such that the three pieces line up to form a smooth channel without projections. Top section 36 and bottom section 38 each have a pair of bolt holes 37, sized and positioned to correspond to bolt holes of a collar corner of a collar beam mount and to align with bolt holes of a collar flange assembly.

Figure 6:
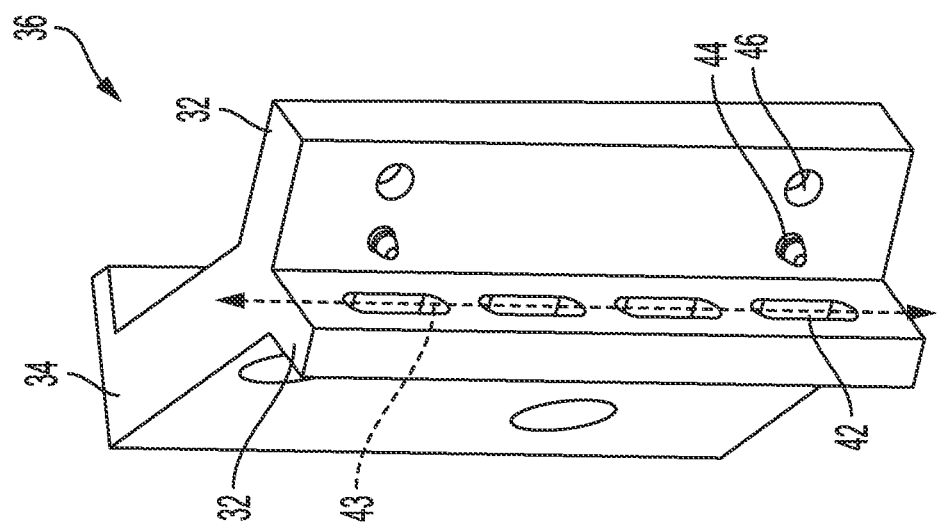
FIG. 6 is an isometric view of a top section of the simulator of FIG. 4.

FIG. 6 shows interior surfaces of feet 32 of top section 36 of the collar corner. Bottom section 38 and middle section 40 may be similarly configured. A first foot includes a plurality of vertically elongate apertures 42 arranged to align with a subset of apertures 30 of faceplate 20 (see FIG. 4). The extent of the apertures may define an axis 43, which is parallel to longitudinal axis 25 of faceplate 20. The extended elongate shape of aperture 42 may allow the apertures to align with the same subset of apertures 30 in multiple configurations, reducing the number of apertures 30 needed.

The second foot includes two pairs of a pin 44 and a circular aperture 46. Each pin 44 is positioned to align with a slot 28 and each circular aperture 46 is positioned to align with a threaded aperture 26 of faceplate 20 (see FIG. 4).

To connect the collar corner to the faceplate, each section may be positioned proximate apertures and slots of the faceplate corresponding to a desired configuration of the support assembly. Each pin 44 may be inserted in to a corresponding one of a selected subset of the plurality of slots 28 of the faceplate. The selected slots may correspond to a desired configuration and may be selected using the guide markings on front face 21. The pins may precisely locate the simulator section relative to the faceplate in the vertical direction or along the Z-axis, without constraining the simulator section in the horizontal plane.

A bolt may be inserted through each elongate aperture 42 and threaded into a corresponding one of a selected subset of the plurality of apertures 26 of the faceplate. The selected apertures may correspond to a desired configuration and may be selected using the guide markings on front face 21. These bolts may precisely locate the section of the collar corner relative to the faceplate in a first horizontal direction or along the Y-axis, without further constraining the simulator section along the Z-axis. These bolts may be left loose temporarily to avoid constraining the simulator section in the second horizontal direction, or along the X-axis.

A bolt may be inserted through each circular aperture 46 and threaded into the corresponding one of a selected subset of the plurality of apertures 30 of the faceplate. The selected apertures may correspond to a desired configuration and may be selected using the guide markings on front face 21. These bolts may be tightened to precisely locate the section of the collar corner relative to the faceplate along the X-axis. The bolts inserted through apertures 42 may then also be tightened. In some examples, other sequences of fastening, or combinations of fasteners may be used. Any effective method of connecting the collar corner simulator to the faceplate precisely without over-constraint may be used.

Figure 2:
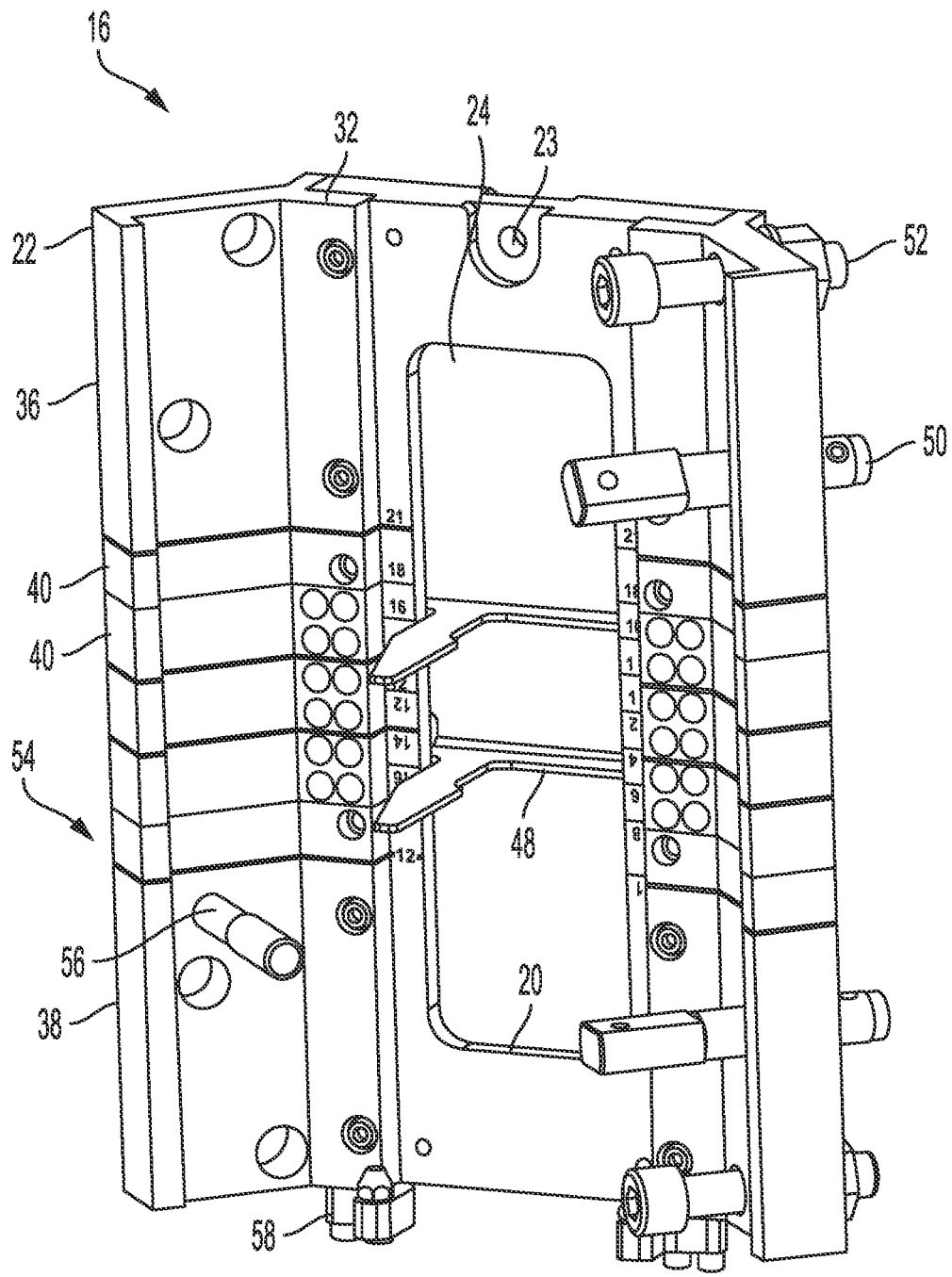
FIG. 2 is an isometric view of the support assembly of the welding fixture of FIG. 1

Returning to FIG. 2, support assembly 16 is shown with collar corner simulators 22 fastened to faceplate 20, as appropriate to receive collar flange assembly 100, shown in FIG. 3. As shown in FIG. 2, support assembly 16 further includes a web arm device 48. The arm device includes a body portion that extends behind central aperture 24 of faceplate 20, and two protrusions that extend from the body portion through the central aperture. The protrusions have a flat edge, configured to contact a side of the web insert of the collar flange assembly. The arm device is configured to support the web insert, and precisely locate the web insert along the X-axis.

Arm device 48 is removably attached to the support assembly. The arm device may be attached to support assembly 16 in any effective, precise, and removable manner. In the present example, the body portion of the arm is magnetically adhered to the back face of faceplate 20. Magnetic attachment may allow for quick and straightforward removal and replacement of the arm.

Arm device 48 may be removed to load the bottom flange into support assembly 16, then replaced prior to loading the web insert. Once the collar flange assembly has been tack welded together and the web insert is supported by the tack welding, arm device 48 may be removed once more for unloading of the collar flange assembly. Arm device 48 may also be removed to improve welding access through central aperture 24 during the welding process.

Figure 7:
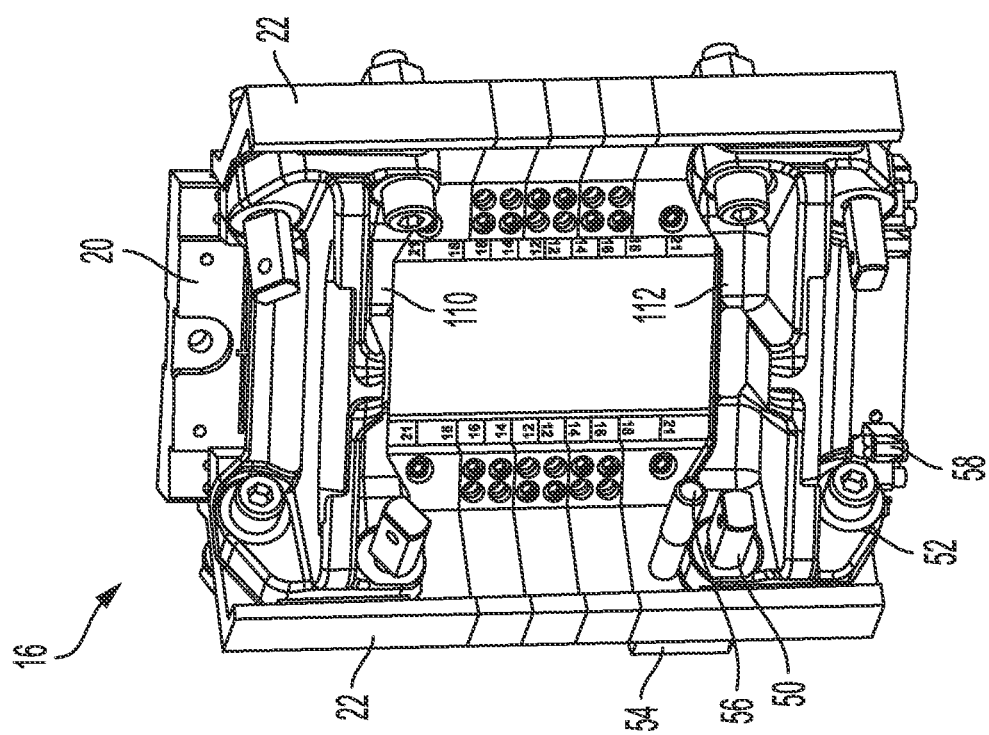
FIG. 7 is an isometric view of a top flange member and a bottom flange member secured in the support assembly of FIG. 2, in an upright position.

FIG. 7 shows support assembly 16 with top flange member 110 and bottom flange member 112 received and fastened in position. Collar corner simulators 22 are in depicted in a different configuration from FIGS. 1 and 2, appropriate for a smaller beam depth. Bottom flange member 112 may be loaded first, lowered down collar corner simulators 22 until contacting stop structures 58. Fasteners may be inserted through the aligned holes on the flange member and each collar corner simulator to secure the flange member in place. Top flange member 110 may be loaded second, and similarly fastened to the collar corner simulators.

In the present example, two types of fasteners are depicted: dowel pins 50 and nut and bolt assemblies 52. One pin and one bolt are used for each pair of bolt holes. Use of dowel pins may reduce time to fasten and release the collar flange assembly, while the bolts may be tightened to securely hold the flange members in position. These fasteners may simulate the attachment of the collar flange assembly to collar corners in a collar beam mount. The connection may thereby help to correctly position the components relative to one another, and also secure the top and bottom flange to support assembly 16 during rotation.

Support assembly 16 also includes a safety latch 54, including a safety key 56. Latch 54 can be seen in more detail in FIGS. 11 and 12, and is described further below. The latch is mounted on bottom section 38 of one of collar corner simulators 22, with key 56 extending through the section to engage the latch mechanism. Mounting safety latch 54 on the collar corner simulator may allow use of the same latch for multiple sizes of collar flange assembly.

Safety key 56 is positioned to prevent removal of bottom flange 112, and sufficiently strong to support the weight of a complete collar flange assembly. If support assembly 16 were to be inadvertently turned upside-down without dowel pins 50 and bolt assemblies 52 in place, the safety key would support and retain the collar flange assembly in the support assembly. Removal of the safety key may engage the safety latch. Engagement of the latch may prevent rotation of support assembly 16. This may ensure that the key is in place when support assembly is not upright.

Figure 8:
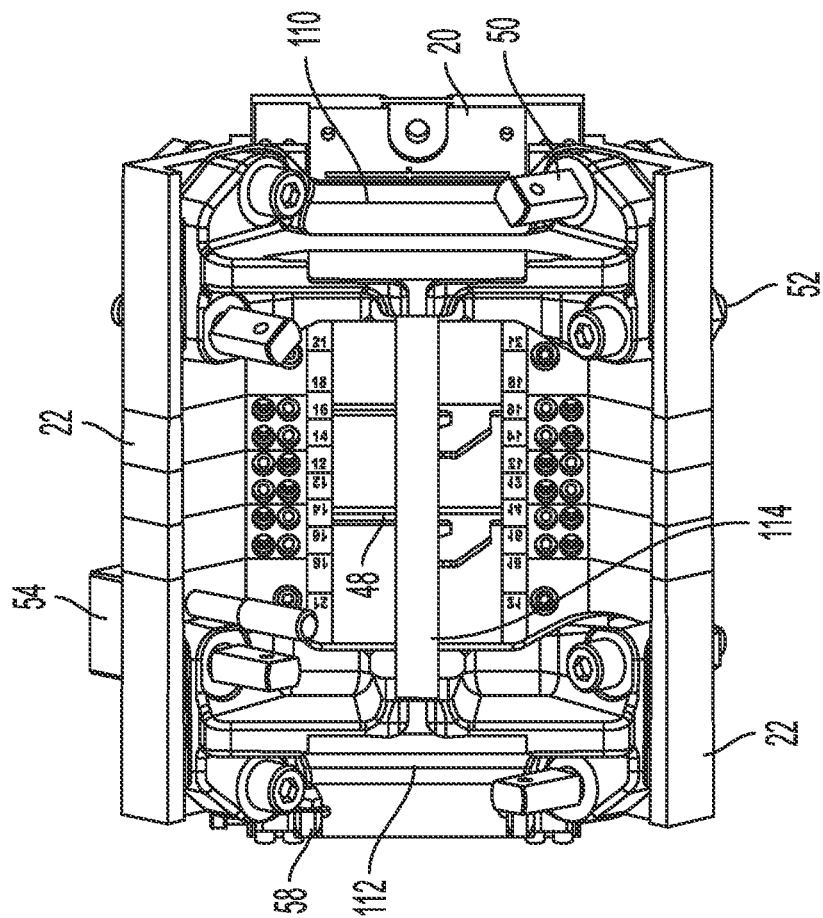
FIG. 8 is an isometric view of a web insert supported by the support assembly of FIG. 2, in a horizontal position.

FIG. 8 shows support assembly 16 in a horizontal orientation. The support assembly may be placed in this orientation by rotation of the mount ring of the assembly station. Once the top and bottom flange members are loaded, web arm device 48 may be connected to the back of faceplate 20, extending through the central opening of the faceplate. In the horizontal position, web insert 114 may be positioned between the top and bottom flanges, supported by arm device 48. The arm device may thereby precisely position the web insert along the X-axis. Web insert 114 may be tack welded to the top and bottom flange members before proceeding with further rotation of support assembly 16.

Figure 9:
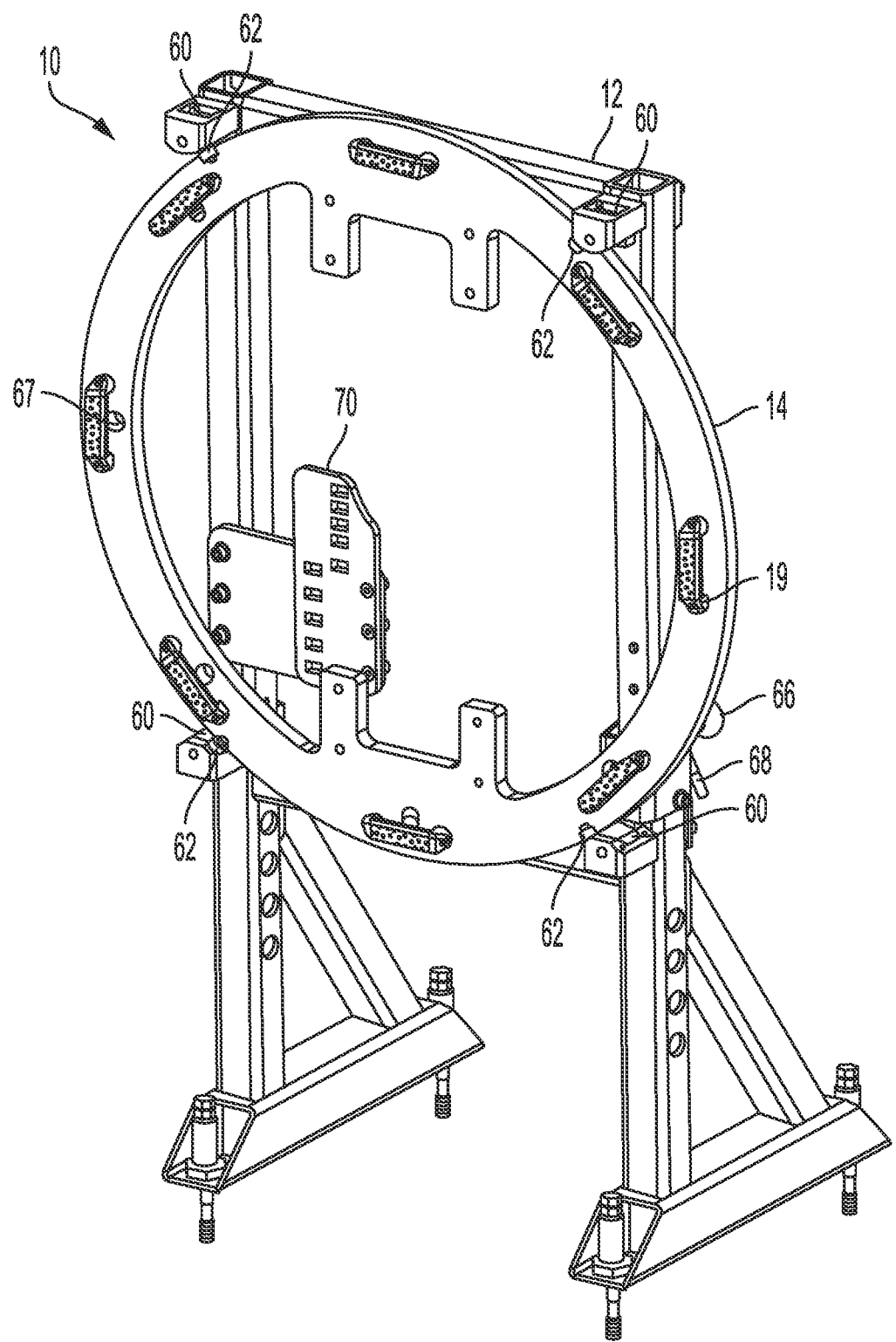
FIG. 9 is an isometric view of the stand and rotatable mount ring of the welding fixture of FIG. 1.

In FIG. 9, assembly station 10 is shown without support assembly 16. As discussed above, other support structures may be mounted to ring 14 and the assembly station may be used in assembly of other structures, or as part of other manufacturing processes.

Ring 14 is rotatably supported by four circumferential support bearings 60, which are mounted on stand 12. Use of circumferential bearings may allow access through the ring to rear portions of a mounted support structure. A pair of alignment bearings 62 is mounted proximate each support bearing, with one of the pair of bearings contact with a front face of ring 14 and the other in contact with a rear face of the ring. The alignment bearings hold ring 14 against stand 12 and maintain the axis of rotation, while allowing smooth and easy rotation.

Figure 10:
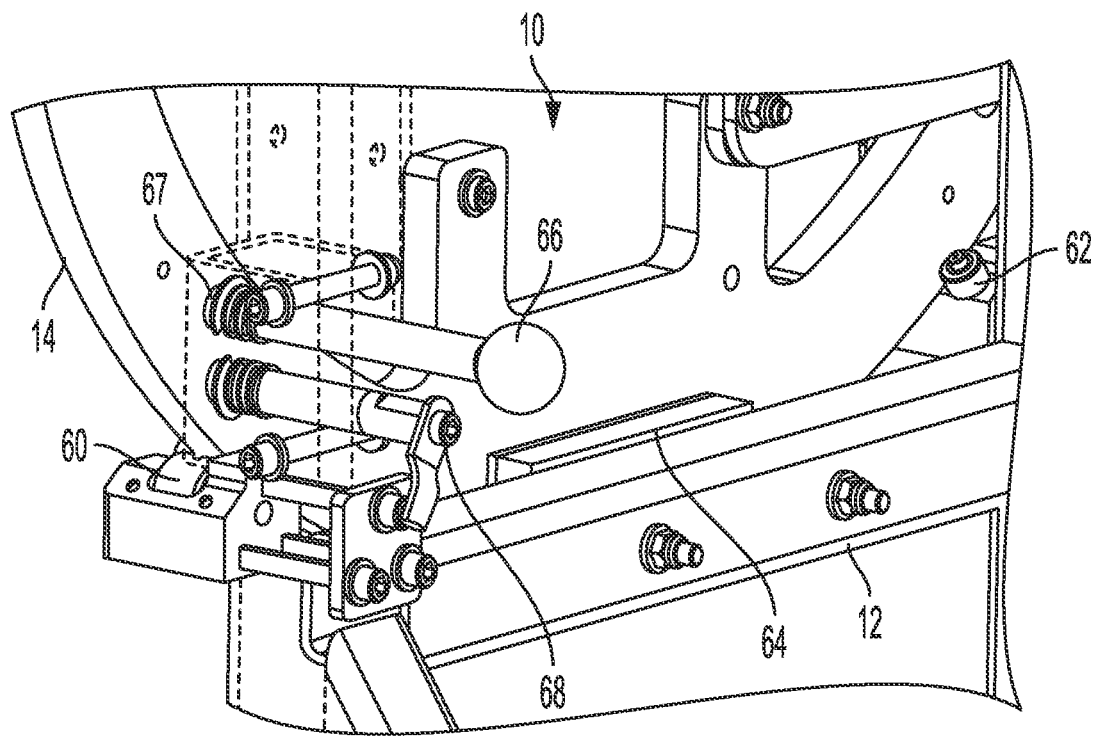
FIG. 10 is an isometric view of a rear portion of the stand and rotatable mount ring of the welding fixture of FIG. 1, showing a vertical member of the stand as transparent.

A detailed view of the rear of assembly station 10 is shown in FIG. 10. A support bearing 60 and a rear bearing of a pair of alignment bearings 62 can be seen in more detail. Also shown is a bumper 64, mounted to a lateral member of stand 12. This bumper may be comprised of a deformable or disposable material. In situations where accident or misuse causes excessive force to be applied to ring 14, the bumper may be deformed rather than the ring. If ring 14 becomes warped due to use or environmental factors, the ring may rub or stick against the bumper and indicate malformation not otherwise visible to a user of the assembly station.

Ring 14 has a secured mode and a rotatable mode. Stand 12 includes manually operable release handle 66, used to transition the ring between secured and rotatable modes. The secured mode may allow for stable loading, unloading, and/or welding, between rotations. In some examples, the rotational mechanism supporting the ring may further include a rotation stop, preventing rotation past a predetermined range. Any effective mechanism may be used to secure the ring.

Figure 12:
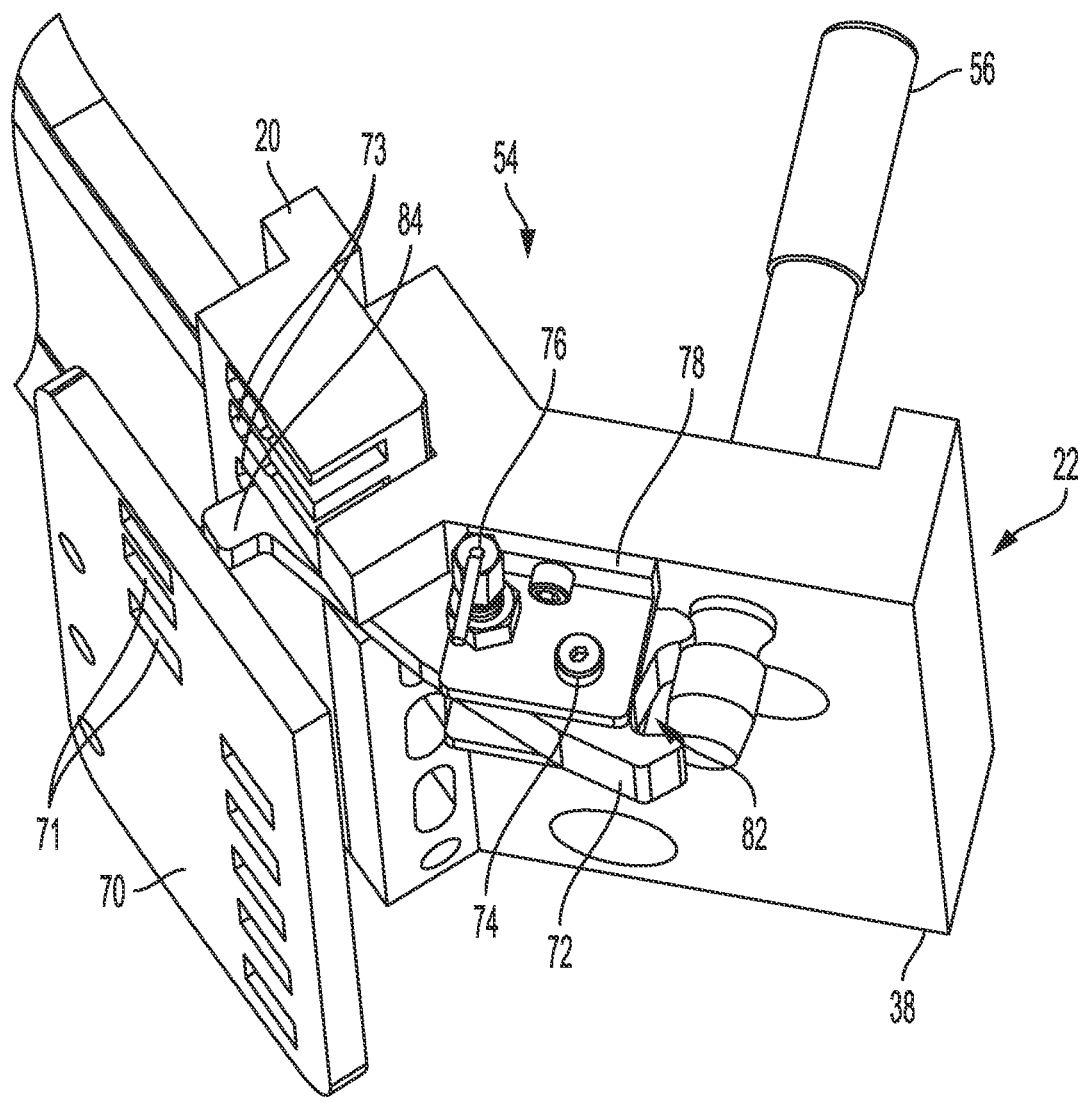
FIG. 12 is a partially cut away isometric view of the safety latch of the welding fixture of FIG. 1.

Release handle 66 is separate from the safety latch shown in FIG. 12, and may independently secure Ring 14. That is, the ring must be in the rotatable mode and the safety key must be inserted to disengage the safety latch before ring 14 can rotate. Either placing ring 14 in the secured mode or engaging the safety latch may prevent rotation of the ring.

In the present example, handle 66 is spring biased to extend through a vertical member of stand 12, into an aperture 67 in ring 14. The handle may be retracted from the aperture to allow rotation, and may slide along the rear face of the ring until the next aperture is aligned. The spring bias may then automatically return the ring to the secured mode. Any number of apertures may be included in ring 14, to allow any number of securable orientations. In the present example, eight apertures 67 are equally spaced around ring 14 as shown in FIG. 9. Ring 14 is thereby securable in orientations corresponding to 0, 45, 90, 135, 180, 225, 270, and 315 degrees. In some examples, ring 14 may be securable by an alternative mechanism in a continuous range of orientations.

Returning to FIG. 10, stand 12 also includes a grounding bar 68. Similarly to handle 66, the bar is spring biased to extend through a vertical member of stand 12 and rest against the rear face of ring 14. The bar may remain in contact with the ring during rotation and while the ring is secured. At an opposite end of bar 68, a contact extends from the bar to allow connection of a ground wire or lead. The grounding bar may be comprised of copper or other electrically conductive material, and may ground voltage on ring 14 associated with welding. This may prevent damage to bearings 60, 62 resulting from undesirable grounding through stand 12.

Figure 11:
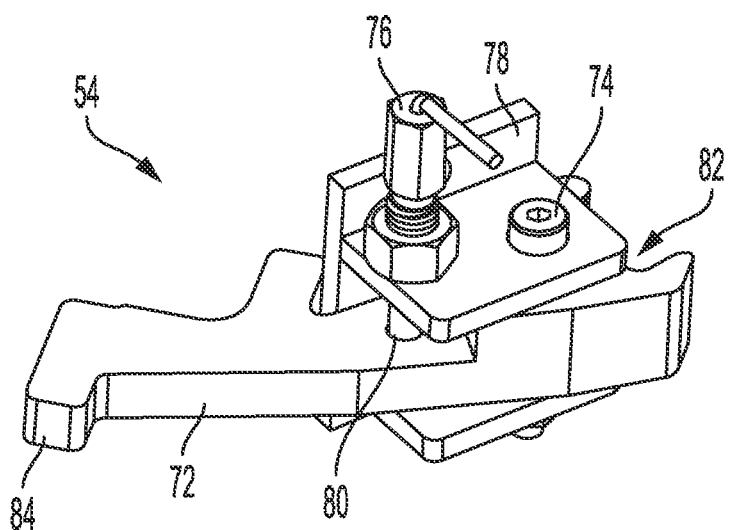
FIG. 11 is an isometric view of the latch arm of the safety latch of the welding fixture of FIG. 1

FIG. 11 is a partial detail view of safety latch 54. The latch includes an arm 72, which is pivotable about a bolt 74. The bolt and a release pin 76 are mounted on a bracket 78. Release pin 76 extends into a hole 80 in arm 72, to selectively prevent the arm from pivoting. A user may lift up the release pin to allow arm 72 to pivot, and the release pin may be biased to return toward arm 72. At a first end, arm 72 includes a recess 82. At a second end, arm 72 includes a tab 84. As shown in FIG. 12, recess 82 is shaped to engage safety key 56, and tab 84 is sized to engage a slot 71 in a latch plate 70. Arm 72 is sized to engage a slot 73 in back face 27 of faceplate 20.

Bracket 78 is mounted to bottom section 38 of collar corner simulator 22. Latch plate 70 is included in stand 12 and can be seen in the context of the stand in FIG. 9. Consequently, bracket 78 and arm 72 of safety latch 54 can be positioned at varying heights relative to latch plate 70, depending on the configuration of collar corner simulator 22. Accordingly, latch plate 70 includes a plurality of slots 71 and faceplate 20 includes a plurality of slots 73, corresponding to each of the possible configurations of collar corner simulator 22. In some examples, latch plate 70 may include additional slots positioned to engage the safety latches of other support assemblies.

The position of safety latch 54 depicted in FIG. 12 may be referred to as an unlatched or disengaged position. A position of the safety latch in which tab 84 is received in a slot 71 may be referred to as a latched or engaged position. In the unlatched position, release pin 76 is aligned with hole 80 in arm 72, and may extend into the hole, thereby preventing pivoting of the arm. Recess 82 engages safety key 56 and prevents removal of the key unless arm 72 is able to pivot. To transition safety latch 54 from the unlatched to the latched position, a user may lift release pin 76 and remove safety key 56.

In the latched position, tab 84 engages latch plate 70 and prevents rotation of the support assembly. Arm 72 is spring-biased to pivot to the latched position, unless prevented by release pin 76. To return safety latch 54 from the latched to the unlatched position, a user may insert safety key 56. Insertion of the safety key may pivot arm 72 such that release pin 76 aligns with hole 80 and extends into the hole.

B. Illustrative Method of Welding a Collar Flange Assembly

This section describes steps of an illustrative method for assembling a collar flange assembly using an assembly station; see FIG. 10. Aspects of collar flange assembly welding fixture 10 described above may be utilized in the method steps described below. Where appropriate, reference may be made to components and systems that may be used in carrying out each step. These references are for illustration, and are not intended to limit the possible ways of carrying out any particular step of the method.

Figure 13:
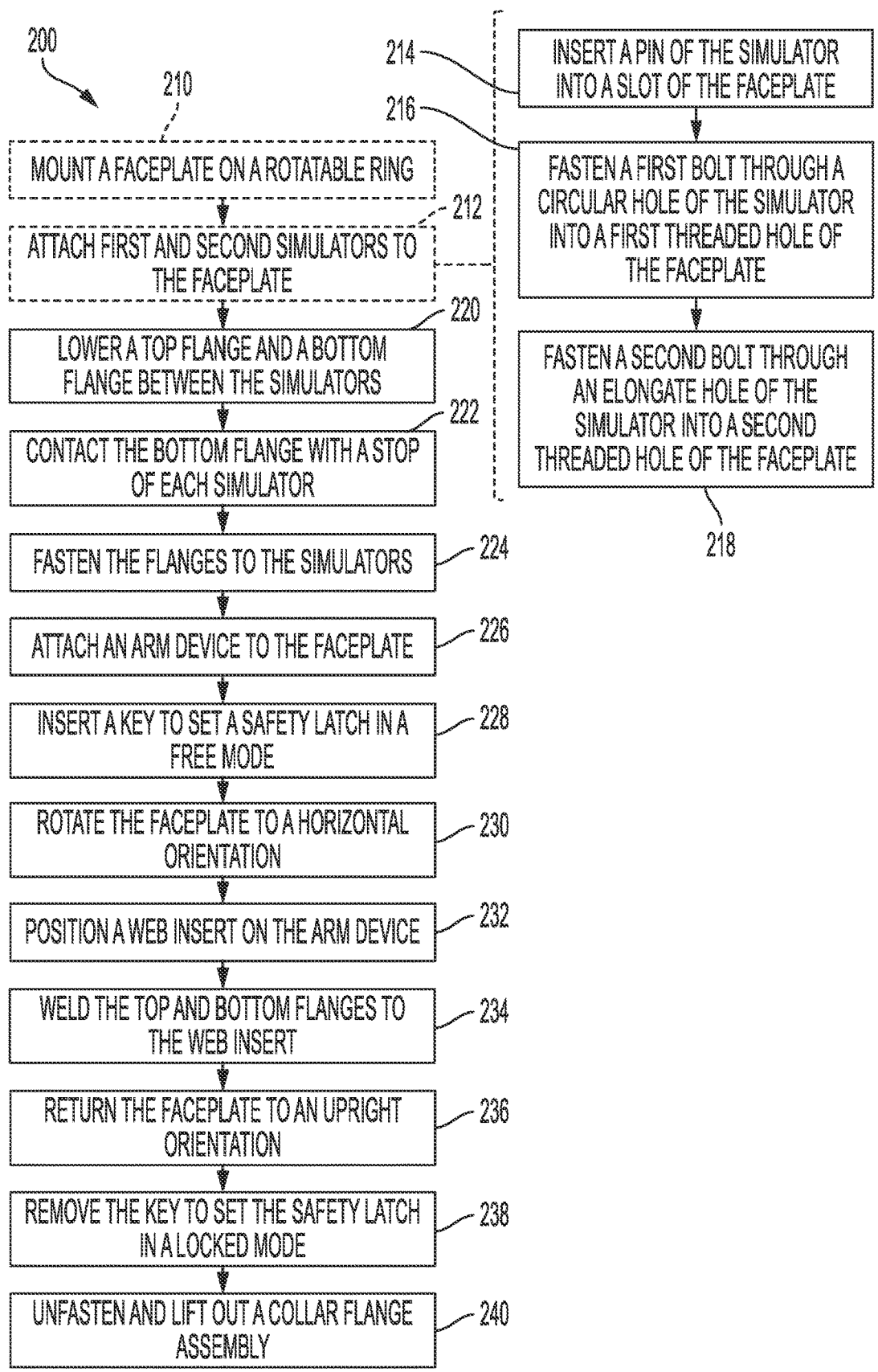
FIG. 13 is a flow chart depicting steps of an illustrative method of welding a collar flange assembly, according to the present teachings.

FIG. 13 is a flowchart illustrating steps performed in an illustrative method, and may not recite the complete process or all steps of the method. Although various steps of method 200 are described below and depicted in FIG. 13, the steps need not necessarily all be performed, and in some cases may be performed simultaneously or in a different order than the order shown.

Optional step 210 of the method includes mounting a faceplate on a rotatable ring. The ring may be supported on a stand having a plurality of circumferential bearings. The faceplate may be selected from a plurality of faceplates, according to the collar flange assembly that is to be assembled. The faceplate may be lifted manually or with lifting equipment and fastened to a mounting structure of the rotatable ring. The faceplate may be mounted to a front side of the ring, such that a center axis of the faceplate coincides with an axis of rotation of the ring. The faceplate may be mounted in a default, upright, 12 o'clock, or 0-degree position, such as is depicted in FIG. 1. A release handle of the stand may be engaged with the ring, a safety latch may be engaged, and/or other mechanisms may be used to stabilize the ring and prevent rotation during steps 210 and 212.

Optional step 212 of the method includes attaching first and second collar corner simulators to the faceplate. The collar corner simulators may be selected and/or configured to have a length corresponding to the collar flange assembly that is to be assembled. The collar corner simulators may be fastened to the faceplate such that they are precisely positioned relative to the faceplate and relative to each other, along X, Y, and Z axes. Substeps 214 through 218 may be performed for each simulator, to fasten the simulators to the faceplate.

Substep 214 includes inserting a pin of the simulator into a slot of the faceplate. The simulator may include multiple pins, and each pin may be inserted in to a corresponding one of a selected subset of a plurality of slots of the faceplate. The selected slots may correspond to a desired configuration of the simulator and may selected using guide markings on the faceplate. The pins may precisely locate the simulator relative to the faceplate in a vertical direction or along a Z-axis, without constraining the simulator section in a horizontal plane.

Substep 216 includes fastening a bolt through an elongate hole of the simulator into a first threaded hole of the faceplate. A bolt may be inserted through each of multiple elongate apertures of the simulator and threaded into a corresponding one of a selected subset of plurality of threaded holes of the faceplate. The selected holes may correspond to a desired configuration of the simulator and may selected using guide markings on the faceplate. These bolts may precisely locate the simulator relative to the faceplate in a first horizontal direction or along a Y-axis, without further constraining the simulator section along the Z-axis. These bolts may be left loose temporarily to avoid constraining the simulator section in a second horizontal direction, or along an X-axis.

Substep 218 includes fastening a second bolt through a circular hole of the simulator into a second threaded hole of the faceplate. The circular hole may extend through the simulator in a direction perpendicular to the extent of the elongate hole of the simulator. Similarly, the second threaded hole of the faceplate may extend perpendicular to the first threaded hole of the faceplate.

A bolt may be inserted through each of multiple circular apertures of the simulator and threaded into a corresponding one of a selected subset of a plurality of threaded apertures of the faceplate. The selected apertures may correspond to a desired configuration of the simulator and may selected using guide markings the faceplate. These bolts may be tightened to precisely locate the section of the collar corner relative to the faceplate along the X-axis. The bolts inserted through the elongate apertures of the simulator may subsequently also be tightened. In some examples, other sequences of fastening, or combinations of fasteners may be used. Any effective method of connecting the collar corner simulator to the faceplate precisely without over-constraint may be used.

In some examples, optional steps 210 and/or 212 may be omitted. For example, a collar flange assembly welding fixture may be used to assemble multiple collar flange assemblies with identical specifications. In such examples, the welding fixture may be prepared by performing steps 210 and 212 once, and method 200 may subsequently be repeated without the optional steps.

Step 220 includes lowering a top flange and a bottom flange between the simulators connected to the faceplate. The faceplate may remain in or may be returned to the upright position for this step. The bottom flange may be lowered first. Step 222 includes contacting the bottom flange with a stop of each simulator. The bottom flange may be rested on and/or supported by the stops. The stops may thereby precisely locate the bottom flange vertically. In some examples the stops may include one or more curved and/or sloped surfaces configured to precisely guide the bottom flange to a horizontal position.

Step 224 includes fastening the top and bottom flanges to the simulators. The bottom flange may be fastened prior to lowering the top flange between the simulators, both simulators may be fastened simultaneously, or may be loaded and fastened in any effective manner. The flanges may be fastened to the simulators through aligned apertures, and by fasteners such as bolts and nuts or dowel pins. Preferably, the fasteners may be selected to allow quick connection while preventing undesirable shifting of the flanges during rotation of the faceplate.

Step 226 includes attaching an arm device to the faceplate. The arm device may include a body portion configured for connection to a back face of the faceplate, and one or more protrusions extending through a central aperture in the faceplate. In some examples, the arm device may be configured to connect to a front face of the faceplate, or to one or both simulators. The arm device may be attached by any effective method, including fastening and/or magnetic adhesion.

Step 228 includes inserting a key to set a safety latch in a free mode. The key may be inserted through an aperture in one of the simulators, to act on a safety latch mounted on the simulator. The key may cause the safety latch to disengage from the stand of the weld fixture and allow rotation of the ring and the attached faceplate. The key may also be positioned and configured to prevent accidental removal of the loaded bottom flange. That is, the key may extend through an aperture above the bottom flange such that the bottom flange is not removable. As a consequence, the bottom flange and any attached components may be prevented from falling when the faceplate is rotated, even if the bottom flange is not fastened to the simulators.

Step 230 includes rotating the faceplate to a horizontal orientation. The horizontal orientation may also be described as a sideways, 3 o'clock, or 90-degree position. To rotate the faceplate, a user may disengage a release handle of the stand from the ring in order to allow rotation of the ring. Once the ring has been rotated to the desired position, the user may re-engage the release handle with the ring to stabilize the faceplate during the following steps.

Step 232 of the method includes positioning a web insert on the arm device. In the horizontal position, the arm device may be disposed vertically below the appropriate position of the web insert. The insert may be placed on and supported by the arm device, the insert being thereby precisely positioned between the top and bottom flanges.

At step 234, method 200 includes welding the top and bottom flanges to the web insert. Following step 232, the web insert may be tack welded to the top and bottom flanges, to maintain the position of the web insert through any rotation of the faceplate. Once the web insert is secured, the faceplate may be rotated through 9 o'clock, 6 o'clock, and/or 3 o'clock positions. Each time the faceplate is rotated, the release handle of the stand may be disengaged to allow rotation of the ring, and then re-engaged to stabilize the faceplate during welding. Changes of orientation may improve access to weld sites, and position welding surfaces for best results. Welding may also be performed from a rear side of the assembly station, by reaching through the rotatable ring and central aperture of the faceplate.

In some examples, additional processes may be performed on the collar flange components and/or collar flange assembly while supported by the weld fixture. For example, a gravity connection adaptor may be welded to the collar flange assembly. Upon completion of welding and any additional processes, step 236 includes returning the faceplate to the upright or 12 o'clock position.

At step 238, the method includes removing the key to set the safety latch in a locked mode. In the locked mode, the ring may be prevented from rotating even when the release handle is disengaged. To remove the key and set the locked mode, a user may lift a release pin of the safety latch, at a rear side of the weld fixture. In some examples, additional or alternative mechanisms may be included in the safety latch. Requiring disengagement or engagement of a secondary mechanism may help to prevent accidental removal of the key.

Step 240 of method 200 includes unfastening and lifting out the completed collar flange assembly. The fasteners used to secure the top and bottom flanges to the simulators may be removed and stored. The collar flange assembly may be lifted from between the simulators and delivered to storage or a next stage of manufacture. In some examples, method 200 may then be repeated from step 220. In some examples, the simulators may be unfastened from the faceplate and/or the faceplate may be removed from the rotatable ring. In such examples, method 200 may then be repeated from step 210 or 212.

ILLUSTRATIVE COMBINATIONS AND ADDITIONAL EXAMPLES

This section describes additional aspects and features of collar flange assembly welding fixture, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A. A collar flange assembly welding fixture, comprising:
a stand having a plurality of circumferential bearings equidistant from an axis of rotation;
a circular mount structure rotatably supported by the circumferential bearings; and
a support assembly configured for mounting on the circular mount structure;
wherein the stand, circular mount structure, and support assembly are configured to provide access to a front side and a back side of a collar flange assembly held by the support assembly.

A1. The fixture of A, wherein the support assembly includes a plate structure having a central opening.

A2. The fixture of A1, wherein the plate structure includes an array of circular and elongate apertures for fastening a pair of collar corner simulators to the plate structure.

A3. The fixture of A2, wherein each circular aperture is a threaded aperture configured to receive a bolt, and each elongate aperture is a slot configured to receive a pin.

A4. The fixture of any of A-A3, wherein the circular mount structure includes a handle for manual rotation of the mount structure relative to the stand.

A5. The fixture of any of A-A4, further comprising a lock mechanism having a locked mode in which the circular mount structure is rotatable about the axis and a free mode in which the circular mount structure is not rotatable.

A6. The fixture of A5, wherein the lock mechanism is configured to prevent removal of a flange assembly held by the support assembly when the lock mechanism is in the free mode.

A7. The fixture of A6, wherein the lock mechanism is configured to allow removal of a flange assembly held by the support assembly only when the support assembly is in an upright rotational orientation and the lock mechanism is in the locked mode.

B. A collar flange assembly welding fixture, comprising:
a plate structure; and
a pair of collar corner simulators attached to the plate structure and configured to support top and bottom collar flange members on opposite ends of a bridging element;
wherein the plate structure has a central opening that provides welding access from both a front side and a back side of the welding fixture.

B1. The fixture of B, further comprising an arm device, attached to a back side of the plate structure, extending through the central opening, and configured to at least partially support the bridging element.

B2. The fixture of B1, wherein the arm device is removably attached to the plate structure.

B3. The fixture of B2, wherein the arm device is magnetically attached to the plate structure.

B4. The fixture of any of B-B3, wherein each collar corner simulator includes a pin that fits into a slot in the plate structure, the slot having a long axis orthogonal to a long axis of the plate structure.

B5. The fixture of B4, wherein each collar corner simulator further includes a hole horizontally adjacent the pin, for receiving a bolt to fasten the simulator to the plate structure.

B6. The fixture of any of B-B5, wherein each collar corner simulator includes a stop member extending outward from a lower end portion, the stop member being configured to locate a lower flange member along a Z-axis.

C. A method of welding a collar flange assembly, comprising:
positioning first and second collar corner simulators on a rotatable plate structure;
receiving top and bottom flange members between the first and second collar corner simulators;
positioning a bridge element between the top and bottom flange members;
welding the flange members to the bridge element through an opening provided in the plate structure.

C1. The method of C, further comprising:
rotating the plate structure to access multiple weld sites.

C2. The method of C or C1, wherein positioning the first and second collar corners simulators includes setting a Z-axis location of each collar corner simulator by inserting a pin on the simulator into an oblong hole in the plate structure, the oblong hole having a long axis orthogonal to a long axis of the plate structure.

C3. The method of C2, wherein positioning the first and second collar corners simulators includes setting an X-axis location of each collar corner simulator by fastening a bolt through a round hole in the simulator to a first threaded hole in the plate structure.

C4. The method of C3, wherein positioning the first and second collar corners simulators includes setting a Y-axis location of each collar corner simulator by fastening a bolt through an oblong hole in the simulator to a second threaded hole in the plate structure, the oblong hole in the simulator having a long axis parallel to the long axis of the plate structure.

D. A collar flange assembly apparatus, comprising:
a stand having a plurality of circumferential bearings equidistant from an axis of rotation,
a circular mount structure rotatably supported by the circumferential bearings.

E. An apparatus for supporting a collar flange assembly prior to welding, comprising:
a faceplate,
a pair of collar corner simulators attached to the faceplate configured to support top and bottom collar flange members on opposite ends of a bridging element, wherein the faceplate has a central opening for providing welding access from both the front and back of the assembly.

F. An apparatus for supporting a collar flange assembly prior to welding, comprising:
a faceplate,
a pair of collar corner simulators attached to the faceplate configured to support top and bottom collar flange members on opposite ends of a bridging element, wherein each collar corner simulator has a pin that fits into a slot in the faceplate, the slot having a long axis orthogonal to a long axis of the faceplate.

F1. The apparatus of F, wherein each collar corner simulator also has a hole horizontally adjacent the pin for receiving a bolt to fasten the simulator to the base plate.

G. An apparatus for supporting a collar flange assembly prior to welding, comprising:
a faceplate having an array of pins and slots for attaching a collar corner simulator having a stop member extending outward from a lower end portion for setting a proper Z-axis location of a lower flange member.

H. A method of welding a collar flange assembly, comprising:
mounting top and bottom flange members on opposite end portions of a bridge element on a rotatable baseplate structure, and welding the flange members to the bridge element through an opening provided on the baseplate.

H1. The method of H, further comprising:
rotating the baseplate structure to access different weld sites.

J. A method of positioning a collar corner simulator on a rotatable baseplate, comprising:
setting the Z-axis location of a collar corner simulator by inserting a pin on the simulator into an oblong hole in the baseplate, the oblong hole having a long axis orthogonal to a long axis of the baseplate.

J1. The method of J, further comprising:
setting X- or Y-axis location of the collar corner simulator by fastening a bolt through a round hole in the simulator to a threaded hole in the baseplate.

J2. The method of J or J1, further comprising:
setting X- or Y-axis location of the collar corner simulator by fastening a bolt through an oblong hole in the simulator to a threaded hole in the baseplate, the oblong hole in the simulator having a long axis parallel to the long axis of the baseplate.

K. A collar flange assembly apparatus, comprising:
a stand having a plurality of circumferential bearings equidistant from an axis of rotation, and
a circular mount structure supported by the circumferential bearings, the circular mount structure being rotatable around the axis when the circular mount structure is in a free mode, and not rotatable when the circular mount structure is in a locked mode.

Advantages, Features, and Benefits

The different examples of the collar flange assembly weld fixture described herein provide several advantages over known solutions for manufacturing collar flange assemblies. For example, illustrative examples described herein allow precise positioning of components of the collar flange assembly during welding.

Additionally, and among other benefits, illustrative examples described herein allow rotation of the collar flange assembly for improved welding access, while maintaining precise positioning.

Additionally, and among other benefits, illustrative examples described herein allow access to the collar flange assembly from a front side and a back side during welding.

Additionally, and among other benefits, illustrative examples described herein include a redundant safety latch to prevent accidental rotation of an unsecured collar flange assembly.

Additionally, and among other benefits, illustrative examples described herein allow reconfiguration for use in manufacture of a variety of styles and sizes of collar flange assembly.

No known system or device can perform these functions, particularly with such safety and ease of use. Thus, the illustrative examples described herein are particularly useful for large scale precision manufacture of full-moment collar components. However, not all examples described herein provide the same advantages or the same degree of advantage.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A collar flange assembly welding fixture, comprising:
a stand having a plurality of circumferential bearings equidistant from an axis of rotation;
a circular mount structure rotatably supported by the circumferential bearings; and
a support assembly configured for mounting on the circular mount structure, and including a plate structure and a pair of collar corner simulators;
a lock mechanism having a free mode in which the circular mount structure is rotatable about the axis and a locked mode in which the circular mount structure is not rotatable, the lock mechanism being configured to prevent removal of a flange assembly held by the support assembly when the lock mechanism is in the free mode;
wherein the stand, circular mount structure, and support assembly are configured to provide access to a front side and a back side of a collar flange assembly held by the support assembly.

2. The fixture of claim 1, wherein the plate structure has a central opening.

3. The fixture of claim 2, wherein the plate structure includes an array of circular and elongate apertures for fastening the pair of collar corner simulators to the plate structure.

4. The fixture of claim 3, wherein each circular aperture is a threaded aperture configured to receive a bolt, and each elongate aperture is a slot configured to receive a pin.

5. The fixture of claim 1, wherein the circular mount structure includes a handle for manual rotation of the mount structure relative to the stand.

6. The fixture of claim 1, wherein the lock mechanism is configured to allow removal of a flange assembly held by the support assembly only when the support assembly is in an upright rotational orientation and the lock mechanism is in the locked mode.

7. A collar flange assembly welding fixture, comprising:
- a plate structure having a central opening that provides welding access from both a front side and a back side of the welding fixture;
- a pair of collar corner simulators attached to the plate structure and configured to support top and bottom collar flange members on opposite ends of a bridging element; and
- an arm device, attached to a back side of the plate structure, extending through the central opening, and configured to at least partially support the bridging element.

8. The fixture of claim 7, wherein the arm device is removably attached to the plate structure.

9. The fixture of claim 8, wherein the arm device is magnetically attached to the plate structure.

10. The fixture of claim 7, wherein each collar corner simulator includes a pin that fits into a slot in the plate structure, the slot having a long axis orthogonal to a long axis of the plate structure.

11. The fixture of claim 10, wherein each collar corner simulator further includes a hole horizontally adjacent the pin, for receiving a bolt to fasten the simulator to the plate structure.

12. The fixture of claim 7, wherein each collar corner simulator includes a stop member extending outward from a lower end portion, the stop member being configured to locate a lower flange member along a Z-axis.

13. A method of welding a collar flange assembly, comprising:
- positioning the first and second collar corner simulators of the collar flange assembly welding fixture of claim 9 on the plate structure of the welding fixture;
- receiving top and bottom flange members between the first and second collar corner simulators;
- positioning a bridge element between the top and bottom flange members;
- welding the flange members to the bridge element through the opening in the plate structure.

14. The method of claim 13, further comprising:
- rotating the plate structure to access multiple weld sites.

15. The method of claim 13, wherein positioning the first and second collar corner simulators includes setting a Z-axis location of each collar corner simulator by inserting a pin on the simulator into an oblong hole in the plate structure, the oblong hole having a long axis orthogonal to a long axis of the plate structure.

16. The method of claim 15, wherein positioning the first and second collar corners simulators includes setting an X-axis location of each collar corner simulator by fastening a bolt through a round hole in the simulator to a first threaded hole in the plate structure.

17. The method of claim 16, wherein positioning the first and second collar corners simulators includes setting a Y-axis location of each collar corner simulator by fastening a bolt through an oblong hole in the simulator to a second threaded hole in the plate structure, the oblong hole in the simulator having a long axis parallel to the long axis of the plate structure.

* * * * *